(12) United States Patent
Vargelci

(10) Patent No.: US 7,736,736 B1
(45) Date of Patent: Jun. 15, 2010

(54) MASKING TAPE ASSEMBLY

(76) Inventor: Murat Vargelci, 178 Ocean Pky, Apt C7, Brooklyn, NY (US) 11218

( * ) Notice: Subject to any disclaimer, the term of this patent is extended or adjusted under 35 U.S.C. 154(b) by 941 days.

(21) Appl. No.: 11/461,654

(22) Filed: Aug. 1, 2006

(51) Int. Cl.
  *B32B 7/12* (2006.01)
  *B32B 9/00* (2006.01)
(52) U.S. Cl. .................. 428/343; 428/40.1; 428/354
(58) Field of Classification Search ............ 428/40.1, 428/343, 354
  See application file for complete search history.

(56) References Cited

U.S. PATENT DOCUMENTS

| | | | |
|---|---|---|---|
| 2,808,358 A | * | 10/1957 | Masse ............... 156/248 |
| 3,736,904 A | | 6/1973 | Kus |
| 4,033,803 A | | 7/1977 | Coder |
| 5,464,692 A | | 11/1995 | Huber |
| 5,786,028 A | | 7/1998 | Cantwell |
| 6,444,307 B1 | | 9/2002 | Tuoriniemi |

* cited by examiner

*Primary Examiner*—Victor S Chang
(74) *Attorney, Agent, or Firm*—Robert W. J. Usher

(57) ABSTRACT

A masking tape assembly has first and second tapes with sticky front faces secured, back-to-back, in overlying relation by a folded hinging tape adhered between them adjacent the first edges so that first edges of the tapes and the fold are aligned. A protective tape covers the adhesive on the second tape. The assembly is mounted on one of two portions of a surface to be painted with the first edges aligned on the border between the portions, paint is applied to the other portion extending also over the aligned first edges; the protective tape removed and the second tape pivoted into adhesion with the other portion. The first masking tape and hinging tape are removed exposing the one portion and paint applied to the one portion to extend over the edge of the second tape, then removed so that the painted portions meet in a clean border.

3 Claims, 3 Drawing Sheets

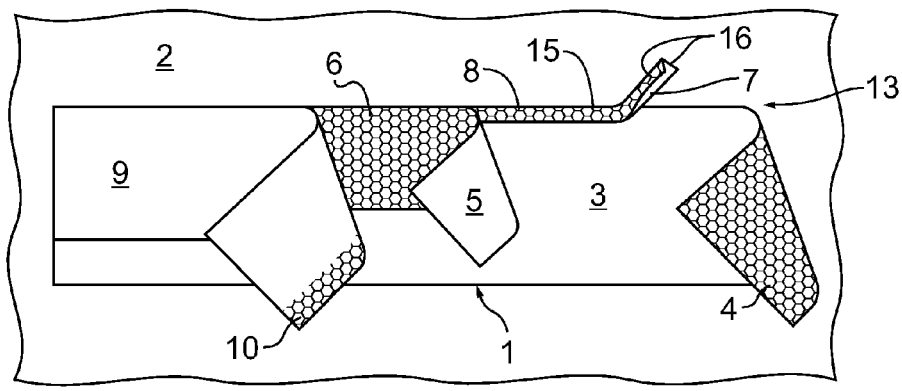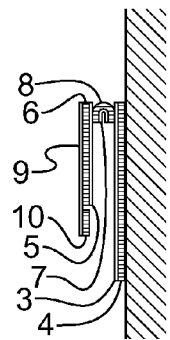
Fig. 1A
Fig. 1B
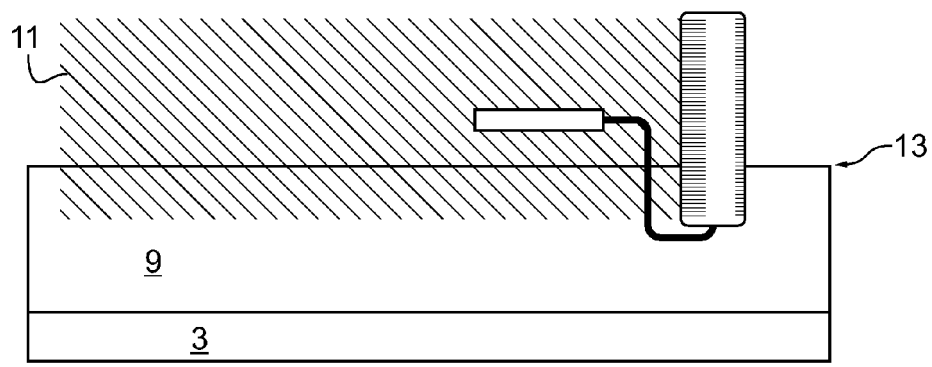
Fig. 2
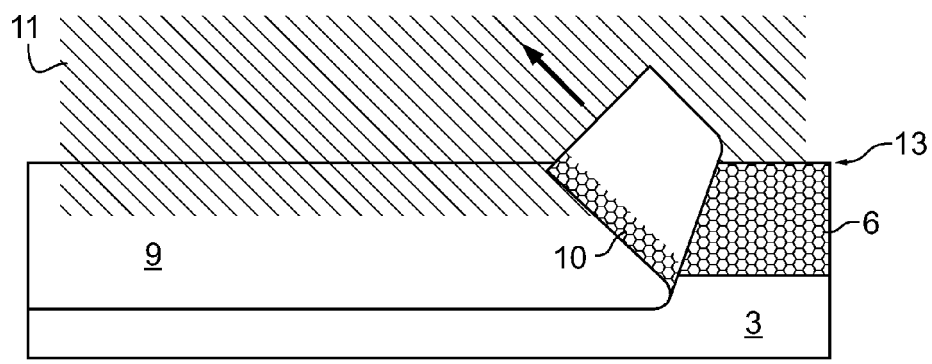
Fig. 3

MASKING TAPE ASSEMBLY

FIELD OF THE INVENTION

The invention relates to a masking tape assembly for enabling adjacent surface portions to be painted in different colors and meet at a clean border without color overlap.

BACKGROUND OF THE INVENTION

Various masking tape assemblies have been known for many years for protecting surfaces from paint smudges and to obtain a clean edge or border line. Examples of prior proposals are taught in U.S. Pat. No. 6,444,307, issued Sep. 3, 2002 to Tuoriniemi; U.S. Pat. No. 5,464,692 issued Nov. 7, 1995 to Huber; U.S. Pat. No. 4,033,803, issued Jul. 5, 1977 to Coder; U.S. Pat. No. 3,736,904 issued Jun. 5, 1973 to Kus and U.S. Pat. No. 5,786,028 issued Jul. 28, 1998 to Cantwell.

However, none of the prior proposals teaches a masking tape assembly enabling two adjoining surface portions to be painted in different colors which meet at a clean border or demarcation, without overlap or smudging, to be easily obtained without removal, re-application and realignment of the same, or a second masking tape to the wall surface to extend precisely along the previously painted edge on one side of the border, which re-application and alignment precisely with the border is a relatively difficult, if not impractical, and time consuming procedure.

SUMMARY OF THE INVENTION

An object of the invention is to provide a masking tape assembly enabling two adjoining surface portions to be painted in different colors which meet at a clean border or demarcation, without overlap or smudging, without requiring removal, re-application and realignment of the same, or a second masking tape to the wall surface to extend precisely along the previously painted edge.

Accordingly, the invention provides a masking tape assembly for enabling adjacent portions of a surface to be painted in different colors that meet in a clean border comprising:

a first masking tape and a second masking tape each having a first longitudinal edge portion and a second longitudinal edge portion opposite the first longitudinal edge portion, a front, sticky face coated with pressure sensitive adhesive and an opposite, back non-sticky face;

an elongate hinging tape having a front sticky face coated with pressure sensitive adhesive and an opposite, back, non-sticky face, the hinging tape being folded back on itself about a longitudinal fold line forming two elongate flap portions extending along a length of the tape so that non-sticky face portions of respective flaps abut each other; and, a protective tape with a first longitudinal edge portion and a rear non-sticky face;

the second masking tape being removably mounted in overlying, back-to-back relation on the first masking tape with the folded hinging tape between them and with the first longitudinal edge portion of the first mounting tape maintained in precise overlying alignment with the fold line of the hinging tape and the first longitudinal edge portion of the second masking tape by adherence of respective front sticky face portions of the respective flap portions of the hinging tape to respective non-sticky back faces of respective first edge portions of the first masking tape and first edge portions of the second masking tape, respectively; and, the protective tape being removably mounted in overlying, back-to-front relation on the front sticky face of the second masking tape so as to cover the front, sticky face of the second tape with the first longitudinal edge portion of the protective tape strip in precise overlying alignment with the first longitudinal edge portion of the second masking tape, the fold line of the hinging tape and the first longitudinal edge portion of the first masking tape;

In operation the masking tape assembly can be secured releasably to the surface to be painted in one of the colors by adhering the front face of the first masking tape to one surface portion on one side of a desired border with the first longitudinal edge portions extending along the border. After painting another portion of the surface on an opposite side of the border from the tape assembly with paint which also extends over the overlying, aligned first longitudinal edge portions of the tape assembly and allowing the paint to dry, the adhesive protecting tape can be peeled away to expose the front, sticky face of the second masking tape and the hinging tape unfolded about the longitudinal hinge line to rotate the second masking tape through 180 degrees to bring the front, sticky face of the second masking tape into adhering abutment with the painted wall surface on another side of the border, opposite the one side of the border to which the first masking tape is adhered and with the first edge portion of the second masking tape extending along the border. The first masking tape and hinging tape can then be peeled away to expose an unpainted surface on the one side of the border. The one side of the surface can be coated with paint so that the paint also extends over the first edge portion of the second masking tape; and, the second masking tape can then be removed to expose said another, painted portion of the wall surface meeting the one painted portion of the wall surface in a clean border.

Thus no realignment of the masking tape with the edge of the initially painted portion is required. The alignment of the second masking tape with the edge of the portion painted initially is obtained, essentially automatically, by simply rotating the second masking tape in situ, on the wall, to extending on another side of the edge, the alignment being maintained by the hinging tape.

It will be appreciated that the surface to be painted can be a wall, ceiling or floor and that the paint can be applied to the surface using a brush, roller or spray and pad.

BRIEF SUMMARY OF THE DRAWINGS

In order that the invention may be readily understood a specific embodiment thereof will now be described by way of example only and with reference to the accompanying drawings in which:

FIG. 1a is a schematic plan view of the masking tape assembly mounted on a lower portion of surface of a wall to be painted in two colors with an upper longitudinal edge extending along the desired border or meeting line of the two colors by adherence of a sticky face of a first masking tape of the assembly to the wall surface and with respective ends of individual tapes shown peeled back for clarity;

FIG. 1B is a schematic end view of another end of the masking tape;

FIG. 2 is a schematic plan view of the masking tape assembly showing roller application of paint of one color to an upper portion of the wall surface;

FIG. 3 is a similar view to FIG. 2, after the upper portion of the wall surface has been painted, showing a protective cover tape of the masking tape assembly being peeled away to expose a sticky face of a second masking tape;

PARTICULAR DESCRIPTION

Figure 4A:
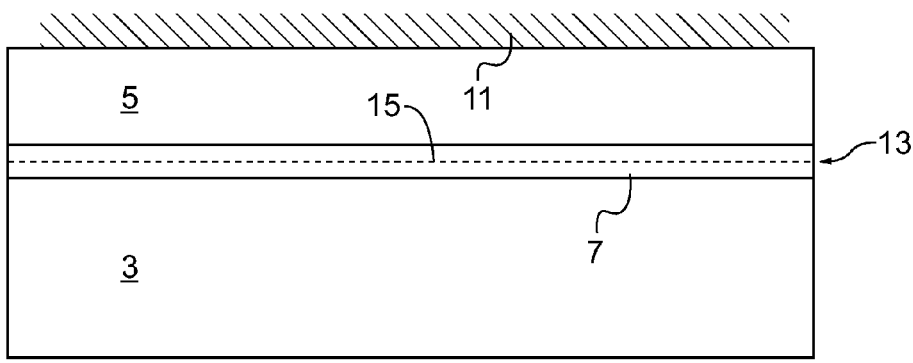
FIG. 4A is a similar view to FIG. 3, showing the remainder of the tape assembly removal of the protective cover tape and rotation of the second masking tape upwardly away from the first masking tape bringing the sticky face into adhesive contact with the painted upper wall surface portion so that the lower edge thereof remains extending along the desired border of the two colors.

As shown particularly in FIG. 1A and FIG. 1B, the masking tape assembly 1 is applied to a wall 2, upper and lower surface portions of which are to be painted in respective different colors, and comprises first and second masking tapes 3 and 5, respectively, having front sticky faces 4 and 6, respectively, coated with suitable, peel away, pressure sensitive adhesive and, opposite, back non-sticky faces.

An elongate hinging tape 7 having a front sticky face 8 coated with pressure sensitive adhesive and an opposite, back, non-sticky face is folded back on itself about a longitudinal fold line 15 to form two elongate flap portions 16, extending along a length of the tape. The second masking tape 5 is removably mounted in overlying, back-to-back relation on the first masking tape 3 by adherence of respective front, sticky faces of respective flap portions 16 of hinging tape 7 to their respective back, non-sticky faces so as to maintain respective upper longitudinal edge portions of the first and second mounting tapes 3 and 5, respectively, in precise overlying alignment with each other and with the fold line 15 of the hinging tape.

A protective tape 9 is of greater lateral width than the lateral width of the second masking tape 5 and less than that of the first masking tape 3 and an area of a back face adjacent the lower edge portion 10 has a coating of pressure sensitive adhesive. The protective tape is removably mounted in overlying, back-to-front relation on the front sticky face 6 of the second masking tape with the upper longitudinal edge portion of the protective tape in precise overlying alignment with corresponding longitudinal edge portions of the first and second masking tapes and the fold line of the hinging tape.

In use, the tape assembly is secured releasably to the lower portion of the wall surface to be painted in two colors by adhering the front, sticky face of the first masking tape to one surface portion on one side of a desired horizontal border 13 with the first longitudinal edge portions extending precisely along the border 13, as indicated in FIG. 1.

The upper portion of the surface, on an opposite side of the border from the tape assembly, is then painted in a desired color so that the paint 11 extends over the upper longitudinal edge portions of the protective tape 9 and other tapes of the tape assembly 1, which are aligned on the border 13, as shown in FIG. 2, ensuring that the paint extends up to the border.

Figure 4B:
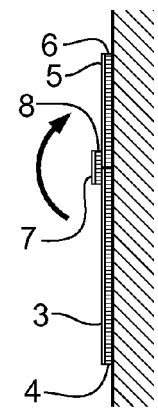
FIG. 4B is a schematic end view of the remainder of the tape assembly shown in FIG. 4A.

After permitting the paint to dry, the adhesive protecting tape 9 is peeled away to expose the front, sticky face 6 of the second masking tape 5 as shown in FIG. 3 and, the hinging tape 7 unfolded about the longitudinal hinge line 15 to rotate the second masking tape through 180 degrees to bring the front, sticky face 6 of the second masking tape 5 into adhering abutment with the painted wall surface on the upper side of the border, opposite the one side of the border to which the first masking tape is adhered and with the first edge portion of the second masking tape extending along the border, as shown in FIGS. 4A and 4B. In this position, the fold line 15, the upper edge of the first masking tape 3 and, the now lower edge of the second masking tape 5 are aligned over the desired border 13

Figure 5A:
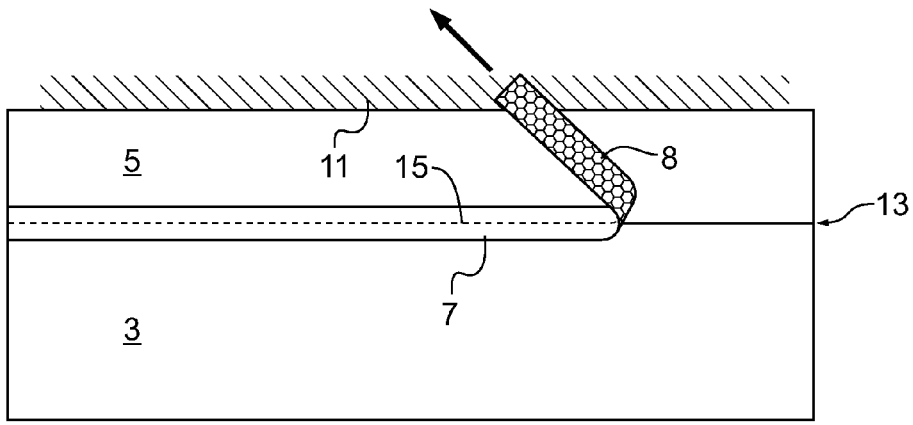
FIG. 5A is a similar view to FIG. 4A, showing a hinge tape of the remainder of the masking tape assembly being peeled away.
Figure 5B:
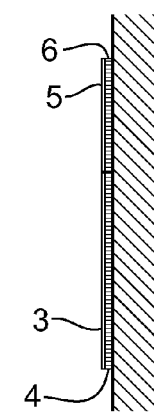
FIG. 5B is a schematic end view of the remainder of the tape assembly shown in FIG. 5A after removal of the hinge tape.
Figure 6A:
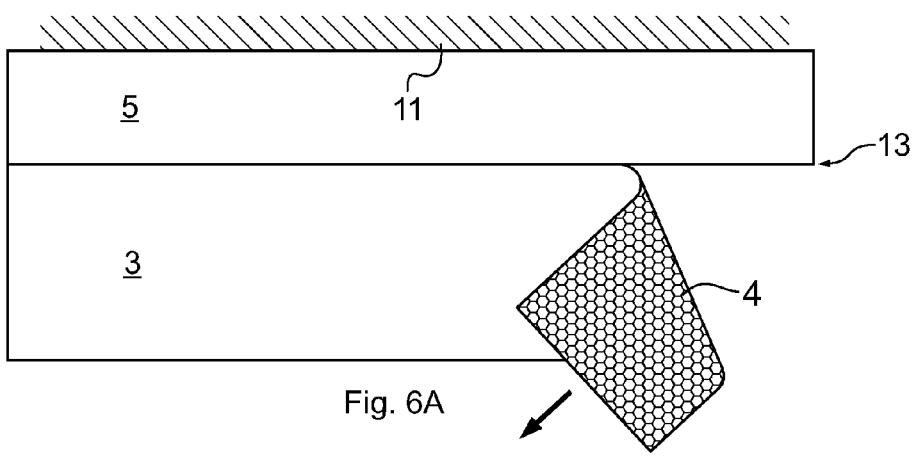
FIG. 6A is a similar view to FIG. 5A, showing the first masking strip being peeled off the lower wall portion exposing the lower wall surface portion for painting
Figure 6B:
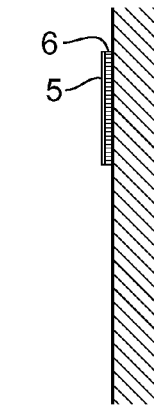
FIG. 6B is a schematic end view of the remainder of the tape assembly shown in FIG. 6A after removal of the first masking tape.

The hinging tape 7 is then peeled away, as shown in FIGS. 5A and 5B and the first masking tape subsequently peeled away, as shown in FIGS. 6A and 6B to expose the unpainted surface portion below the border.

Figure 7:
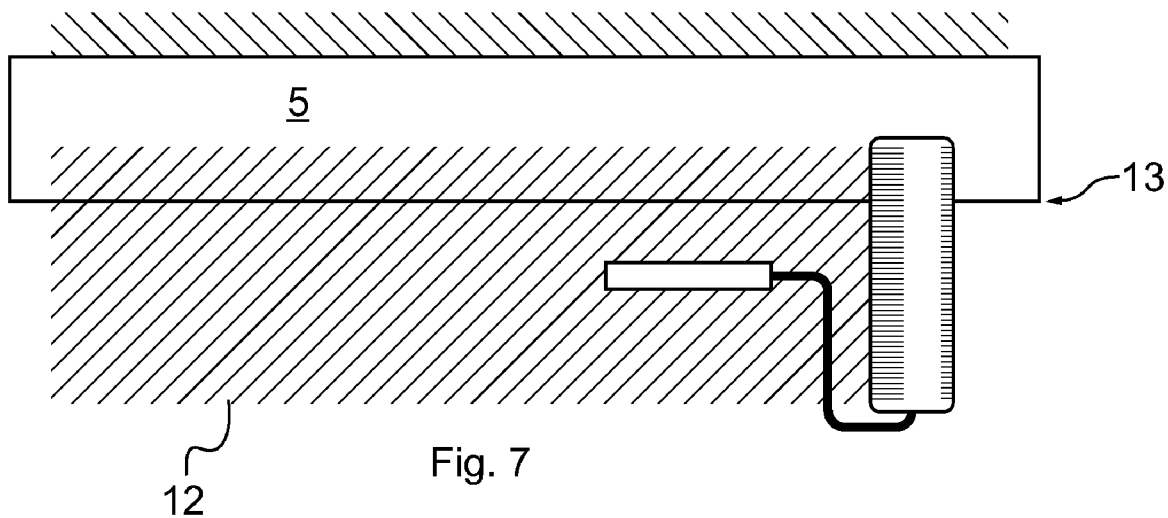
FIG. 7 is a similar view to FIG. 6A, showing roller application of paint of the other color to the lower portion of the wall surface; and, FIG. 8 is a similar view to FIG. 7, showing the second masking strip being peeled off the painted upper wall surface portion exposing the clean border or line of demarcation where the two colors painted on respective upper and lower wall surface portions meet.
Figure 8:
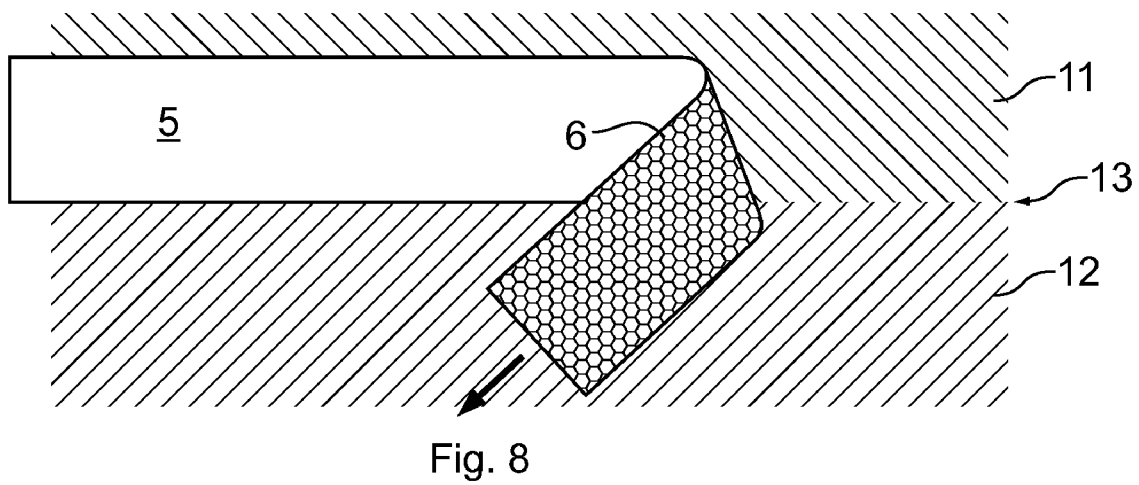

The lower surface portion is then coated with paint 12 of the other color so that the paint 12 also extends over, the now lower first edge portion of the second masking tape 5, as shown in FIG. 7 and the second masking tape 5 is then removed by peeling to expose the earlier painted upper surface portion of the wall with the paint 11 on the upper portion meeting the paint 12 on the lower portion in a straight, clean, horizontal border.

It will be appreciated that the tape assembly can also be used to obtain precisely defined, clean, vertical borders in adjacent surface portions defining vertical or horizontal corners of walls painted in different colors or a wall and ceiling in different colors where the second tape is rotated through 90 degrees instead of 180 degrees.

The invention claimed is:

1. A masking tape assembly for enabling adjacent portions of a surface to be painted in different colors that meet in a clean border comprising:

a first masking tape and a second masking tape each having a first longitudinal edge portion and a second longitudinal edge portion opposite the first longitudinal edge portion, a front, sticky face coated with pressure sensitive adhesive and an opposite, back face;

an elongate hinging tape having a front face coated with pressure sensitive adhesive and an opposite, back, non-sticky face, the hinging tape being folded back on itself about a longitudinal fold line forming two elongate flap portions extending along a length of the hinging tape so that non-sticky face portions of respective flaps abut each other; and, a protective tape with a first longitudinal edge portion and a rear non-sticky face;

the second masking tape being removably mounted in overlying, back-to-back relation on the first masking tape with the folded hinging tape between them and with the first longitudinal edge portion of the second masking tape maintained in precise overlying alignment with the fold line of the hinging tape and the first longitudinal edge portion of the first masking tape by adhesive on at least one of the front face portions of the flap portions of the hinging tape and on respective faces of respective first edge portions of the first masking tape and first edge portions of the second masking tape, and, the protective tape being removably adhered in overlying, back-to-front relation on the front sticky face of the second masking tape by adhesive on at least one of the front face of the protective tape and on the front face of the second masking tape so as to cover the front, face of the second masking tape and the hinging tape and with the first longitudinal edge portion of the protective tape in precise overlying alignment with the first longitudinal edge portion of the second masking tape, the fold line of the hinging tape and the first longitudinal edge portion of the first masking tape;

wherein a lateral width of the second masking tape, as measured between its first and second longitudinal edge portions, is less than a lateral width of the first masking tape, as measured between its first and second longitudinal edge portions, so that the non-sticky face of the first masking tape has a portion which protrudes laterally beyond the second edge portion of the second masking tape, the protective tape having a second longitudinal edge portion opposite its first longitudinal edge portion and which extends beyond the second longitudinal edge portion of the second masking tape to overlap the laterally protruding portion of the first masking tape and has pressure sensitive adhesive securing releasably its second longitudinal edge portion to the protruding portion of the first masking tape to maintain the tape assembly flat;

whereby, in operation:

the tape assembly can be secured releasably to the surface to be painted in one of the colors by adhering the front face of the first masking tape to one surface portion on one side of a desired border with the first longitudinal edge portions extending along the border;

after painting another portion of the surface on an opposite side of the border from the tape assembly with paint which also extends over the overlying, aligned first longitudinal edge portions of the tape assembly and allowing the paint to dry, the adhesive protecting tape can be peeled away to expose the front, sticky face of the second masking tape and the hinging tape unfolded about the longitudinal hinge line to rotate the second masking tape through 180 degrees to bring the front, sticky face of the second masking tape into adhering abutment with the painted wall surface on another side of the border, opposite the one side of the border to which the first masking tape is adhered and with the first edge portion of the second masking tape extending along the border;

the first masking tape and hinging tape can then be peeled away to expose an unpainted surface on the one side of the border;

the one side of the surface can be coated with paint so that the paint also extends over the first edge portion of the second masking tape; and, the second masking tape can then be removed to expose said another, painted portion of the wall surface meeting the one painted portion of the wall surface in a clean border.

2. A masking tape assembly according to claim 1 wherein the opposite, back face of the first masking strip is non-sticky and the front face of the hinging tape is sticky.

3. A masking tape assembly according to claim 1 wherein the opposite, back face of the first masking strip is non-sticky and the front face of the hinging tape is sticky.

\* \* \* \* \*